(12) United States Patent
Zhang et al.

(10) Patent No.: US 12,315,232 B1
(45) Date of Patent: May 27, 2025

(54) METHOD FOR GENERATING INDUSTRIAL DEFECT IMAGE, DEVICE, MEDIUM, AND PRODUCT

(71) Applicant: Nanchang Hangkong University, Nanchang (CN)

(72) Inventors: Congxuan Zhang, Nanchang (CN); Shijie Zhang, Nanchang (CN); Leqi Jiang, Nanchang (CN); Liyue Ge, Nanchang (CN); Zige Wang, Nanchang (CN); Zhen Chen, Nanchang (CN); Chengzhong Wu, Nanchang (CN); Yaonan Wang, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 0 days.

(21) Appl. No.: 19/031,482

(22) Filed: Jan. 18, 2025

(30) Foreign Application Priority Data

Jul. 23, 2024 (CN) .......................... 202410985255.1

(51) Int. Cl.
*G06T 11/00* (2006.01)
*G06T 7/00* (2017.01)
(Continued)

(52) U.S. Cl.
CPC ............ *G06V 10/774* (2022.01); *G06T 7/001* (2013.01); *G06T 11/00* (2013.01);
(Continued)

(58) Field of Classification Search
CPC ............ G06V 10/774; G06V 10/7715; G06V 10/776; G06V 10/7792; G06V 10/82;
(Continued)

(56) References Cited

U.S. PATENT DOCUMENTS

2022/0253648 A1 * 8/2022 Yang ..................... G06V 10/82

FOREIGN PATENT DOCUMENTS

| CN | 111798409 A | * | 10/2020 | ........... G06K 9/4604 |
| CN | 118115835 A | | 5/2024 | |
| WO | WO-2023085479 A1 | * | 5/2023 | ......... G01N 21/8851 |

OTHER PUBLICATIONS

CNIPA, Office Action, Application No. 202410985255.1, Aug. 27, 2024.

* cited by examiner

*Primary Examiner* — Samir A Ahmed
(74) *Attorney, Agent, or Firm* — WCF IP

(57) ABSTRACT

A method for generating an industrial defect image, a device, a medium, and a product are provided, relating to the field of image processing. The method includes: acquiring an industrial defect-free image; and generating an industrial defect image based on the industrial defect-free image by using a defect image generation model. The defect image generation model is constructed based on a cyclic Generative Adversarial Network (GAN); the defect image generation model includes two generators and two discriminators, with each generator including an encoder, a transformer, and a decoder connected in sequence; the encoder uses convolution operations to extract features from an input image, the transformer uses a self-attention-based residual network to transform an image output by the encoder, and the decoder uses a skip connection mechanism and deconvolution operations to decode an image output by the transformer to obtain a generated image.

8 Claims, 5 Drawing Sheets

(51) Int. Cl.
  *G06V 10/77*  (2022.01)
  *G06V 10/774*  (2022.01)
  *G06V 10/776*  (2022.01)
  *G06V 10/778*  (2022.01)
  *G06V 10/82*  (2022.01)
  *G06V 10/52*  (2022.01)

(52) U.S. Cl.
  CPC ........ *G06V 10/7715* (2022.01); *G06V 10/776* (2022.01); *G06V 10/7792* (2022.01); *G06V 10/82* (2022.01); *G06T 2207/20016* (2013.01); *G06T 2207/20081* (2013.01); *G06T 2207/20084* (2013.01); *G06T 2207/30108* (2013.01); *G06V 10/52* (2022.01); *G06V 2201/06* (2022.01)

(58) Field of Classification Search
  CPC .... G06V 10/52; G06V 2201/06; G06T 7/001; G06T 11/00; G06T 2207/20016; G06T 2207/20081; G06T 2207/20084; G06T 2207/30108
  See application file for complete search history.

METHOD FOR GENERATING INDUSTRIAL DEFECT IMAGE, DEVICE, MEDIUM, AND PRODUCT

CROSS REFERENCE TO RELATED APPLICATION

This patent application claims the benefit and priority of Chinese Patent Application No. 202410985255.1, filed with the China National Intellectual Property Administration on Jul. 23, 2024, the disclosure of which is incorporated by reference herein in its entirety as part of the present application.

TECHNICAL FIELD

The present disclosure relates to the field of image processing, and in particular, to a method for generating an industrial defect image, a device, a medium, and a product.

BACKGROUND

Surface defect detection of industrial products has become a key aspect of industrial manufacturing. Industrial defect detection aims to identify various appearance flaws in industrial products, serving as one of the important technologies to ensure product quality and maintain production stability. However, in actual production, it is often difficult to collect defect image samples. Without a sufficient number of defect image samples, training defect detection models becomes challenging. Currently, there are many research directions for enhancing the quantity of image data samples. Compared to other traditional image generation algorithms, Generative Adversarial Networks (GANs) based on feature learning can generate images with higher resolution and clarity at a faster speed, thus becoming increasingly favored by scholars and becoming one of the important application technologies in the field of industrial defect image generation.

At present, most images generated by GAN models have high accuracy. However, the uneven scale distribution of industrial defects and the irregular shapes of defects lead to industrial defect images being more complex in features such as contours, textures, and backgrounds than general images. Existing GAN models often fail to generate controllable, stable, and complex industrial defect images.

SUMMARY

An objective of the present disclosure is to provide a method for generating an industrial defect image, a device, and a product, to improve the stability and quality of industrial defect image generation.

To achieve the above objective, the present disclosure provides the following technical solutions.

According to a first aspect, the present disclosure provides a method for generating an industrial defect image, including the following steps:

acquiring an industrial defect-free image; and generating an industrial defect image based on the industrial defect-free image by using a defect image generation model, where the defect image generation model is constructed based on a cyclic Generative Adversarial Network (GAN); the defect image generation model includes two generators and two discriminators, with each generator including an encoder, a transformer, and a decoder connected in sequence; the encoder uses convolution operations to extract features from an input image, the transformer uses a self-attention-based residual network to transform an image output by the encoder, and the decoder uses a skip connection mechanism and deconvolution operations to decode an image output by the transformer to obtain a generated image; the two generators of the defect image generation model are referred to as a first generator and a second generator.

Said generating the industrial defect image based on the industrial defect-free image by using the defect image generation model specifically includes: performing feature extraction on the industrial defect-free image through convolution operations by using the encoder of the first generator that has been pre-trained, to obtain a preliminary feature map; integrating features in the preliminary feature map through the self-attention-based residual network by using the transformer of the first generator that has been pre-trained, to obtain an integrated feature map; and restoring the integrated feature map to a target domain through a skip connection mechanism and deconvolution operations by using the decoder of the first generator that has been pre-trained, to obtain the industrial defect image.

According to a second aspect, the present disclosure provides a computer device, including a memory, a processor, and a computer program stored in the memory and executable on the processor, where the computer program is executed by the processor to implement the above method for generating an industrial defect image.

According to a third aspect, the present disclosure provides a computer-readable storage medium, where the computer-readable storage medium stores a computer program, and the computer program is executed by a processor to implement the above method for generating an industrial defect image.

According to a fourth aspect, the present disclosure provides a computer program product, including a computer program, where the computer program is executed by a processor to implement the above method for generating an industrial defect image.

According to the embodiments provided by the present disclosure, the present disclosure discloses the following technical effects: the present disclosure provides a method for generating an industrial defect image, a device, a medium, and a product. A defect image generation model is constructed based on a cyclic GAN with dual generators and dual discriminators, which reduces the loss of important detail information during industrial defect image generation and maintains the consistency of generated image content. A self-attention mechanism and a skip connection mechanism are introduced in the generator to perform long-distance and multi-scale feature extraction on an input image, which improves the global perspective of feature extraction and the ability to extract multi-scale features, thereby enhancing the stability and quality of industrial defect image generation.

BRIEF DESCRIPTION OF THE DRAWINGS

To describe the technical solutions in the embodiments of the present disclosure or in the prior art more clearly, the following briefly describes the accompanying drawings required for the embodiments. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

The technical solutions in the embodiments of the present disclosure are clearly and completely described below with reference to the drawings in the embodiments of the present disclosure. Apparently, the described embodiments are only some rather than all of the embodiments of the present disclosure. All other embodiments obtained by a person of ordinary skill in the art based on the embodiments of the present disclosure without creative efforts shall fall within the protection scope of the present disclosure.

To make the above objectives, features, and advantages of the present disclosure more obvious and easy to understand, the present disclosure will be further described in detail with reference to the accompanying drawings and specific implementations.

Figure 1:
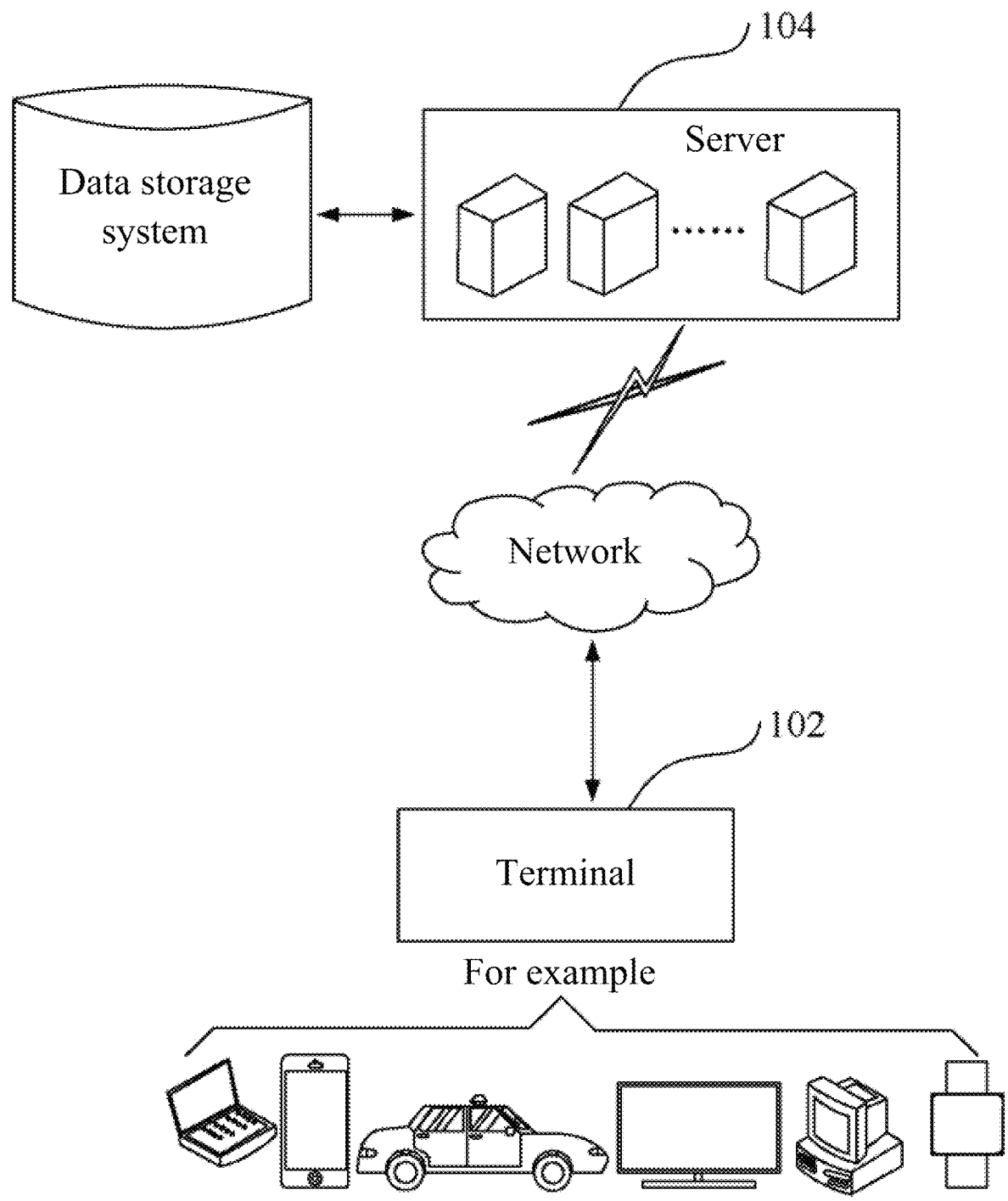
FIG. 1 a diagram illustrating an application environment of a method for generating an industrial defect image according to an embodiment of the present disclosure.

A method for generating an industrial defect image provided by the present disclosure can be applied in the application environment shown in FIG. 1. A terminal 102 communicates with a server 104 via a network. A data storage system can store data that the server 104 needs to process. The data storage system can be independently set up, integrated with the server 104, or placed in the cloud or on other servers. The terminal 102 can send an industrial defect-free image to the server 104, and after receiving the industrial defect-free image, the server 104 generates an industrial defect image by using the defect image generation model. The server 104 can also return the generated industrial defect image to the terminal 102. Additionally, in some embodiments, the method for generating an industrial defect image can be implemented independently by either the server 104 or the terminal 102. For example, the terminal 102 can directly generate the industrial defect image based on the industrial defect-free image, or the server 104 can retrieve the industrial defect-free image from the data storage system and generate the industrial defect image.

The terminal 102 can be, but is not limited to, various desktop computers, laptops, smartphones, tablets, Internet of Things (IoT) devices, and portable wearable devices. The IoT device may be a smart speaker, a smart TV, a smart air conditioner, a smart in-vehicle device, or the like. The portable wearable device can be a smart watch, a smart band, a head-mounted device, or the like. The server 104 can be implemented using a standalone server, a server cluster consisting of a plurality of servers, or a cloud server.

Figure 2:
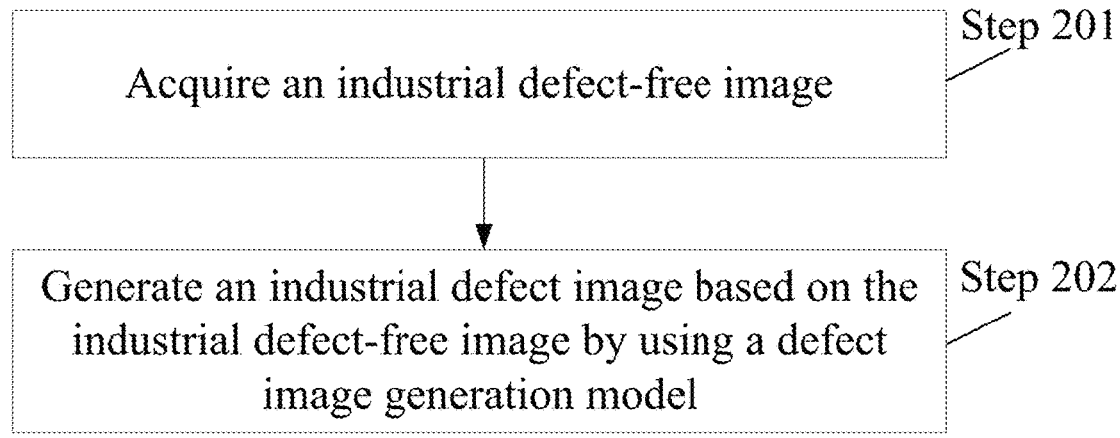
FIG. 2 is a schematic flowchart of a method for generating an industrial defect image according to an embodiment of the present disclosure.

In an exemplary embodiment, as shown in FIG. 2, a method for generating an industrial defect image is provided, which is executed by a computer device. Specifically, the method can be executed solely by a computer device such as a terminal or a server, or jointly by a terminal and a server. In the embodiments of the present disclosure, the method being applied on the server 104 in FIG. 1 is taken as an example for description, including step 201 to step 202 as follows:

Step 201: Acquire an industrial defect-free image.

Step 202: Generate an industrial defect image based on the industrial defect-free image by using a defect image generation model.

In the present disclosure, one or more industrial defect images can be generated based on a single industrial defect-free image. Furthermore, the defect detection model is generated based on the generated industrial defect images, thereby enabling the detection of surface defects in industrial products. Defects in the industrial defect images mainly include inclusions, spots, and scratches.

The defect image generation model is constructed based on a cyclic Generative Adversarial Network (GAN). The defect image generation model includes two generators and two discriminators, with each generator including an encoder, a transformer, and a decoder connected in sequence. The encoder uses convolution operations to extract features from an input image, the transformer uses a self-attention-based residual network to transform an image output by the encoder, and the decoder uses a skip connection mechanism and deconvolution operations to decode an image output by the transformer to obtain a generated image.

In this embodiment, the defect image generation model is obtained by performing cyclic adversarial training on the two generators and the two discriminators using a sample set in advance. The training sample set includes multiple pairs of positive and negative samples, where the positive samples are defect-free sample images, and the negative samples are defect sample images.

The two generators of the defect image generation model are referred to as a first generator and a second generator, while the two discriminators are referred to as a first discriminator and a second discriminator. During a cyclic adversarial training process, the first generator is used to generate defect images based on the defect-free sample images or defect-free images generated by the second generator, while the second generator is used to generate defect-free images based on the defect sample images or the defect images generated by the first generator. The first discriminator is used to determine data distribution of the defect images generated by the first generator, while the second discriminator is used to determine data distribution of the defect-free images generated by the second generator.

Figure 3:
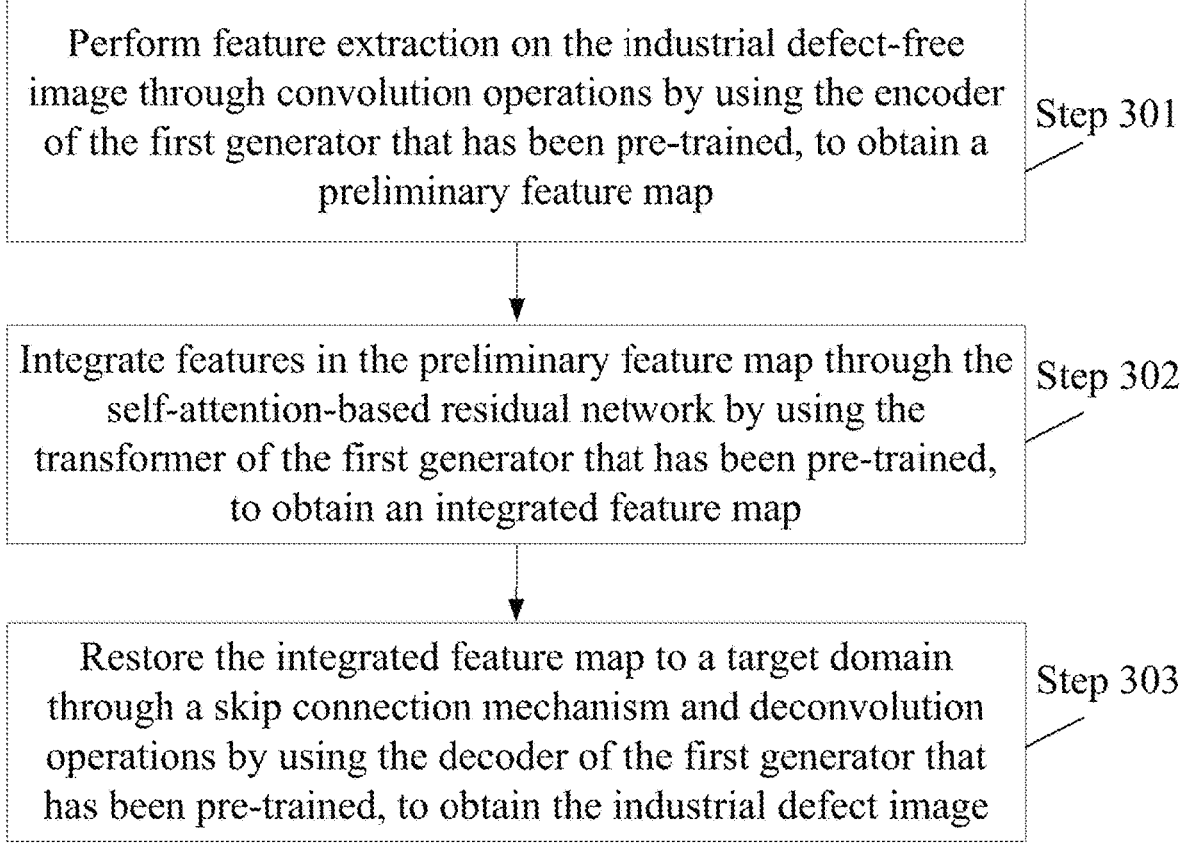
FIG. 3 is a schematic flowchart of a process of generating an industrial defect images by a first generator according to an embodiment of the present disclosure.

In an exemplary embodiment, as shown in FIG. 3, step 202 includes step 301 to step 303.

Step 301: Perform feature extraction on the industrial defect-free image through convolution operations by using the encoder of the first generator that has been pre-trained, to obtain a preliminary feature map.

In this embodiment, the encoder extracts features from the image through a series of convolutions, that is, the encoder of the first generator that has been pre-trained uses the following formula to extract features from the industrial defect-free image:

$$A_i = \text{ReLU}(\text{Conv}(A_{i-1}, W_i) + b_i).$$

where i represents a serial number of a convolution layer in the encoder, i=1, 2, ..., n, and n represents the quantity of convolution layers; $A_{i-1}$ is an output of an (i−1)-th convolution layer; when i=1, $A_{i-1}=A_0$ is an output of the 0th convolution layer, representing an industrial defect-free image; $A_i$ is an output of an i-th convolution layer; $A_n$ is an output of an n-th convolution layer, that is, the preliminary feature map; $W_i$ is a convolution kernel of the i-th convolution layer; $b_i$ is a bias term of the i-th convolution layer; Conv( ) represents a convolution operation, and ReLU( ) represents a rectified linear activation function.

Step 302: Integrate features in the preliminary feature map through the self-attention-based residual network by using the transformer of the first generator that has been pre-trained, to obtain an integrated feature map.

Figure 4:
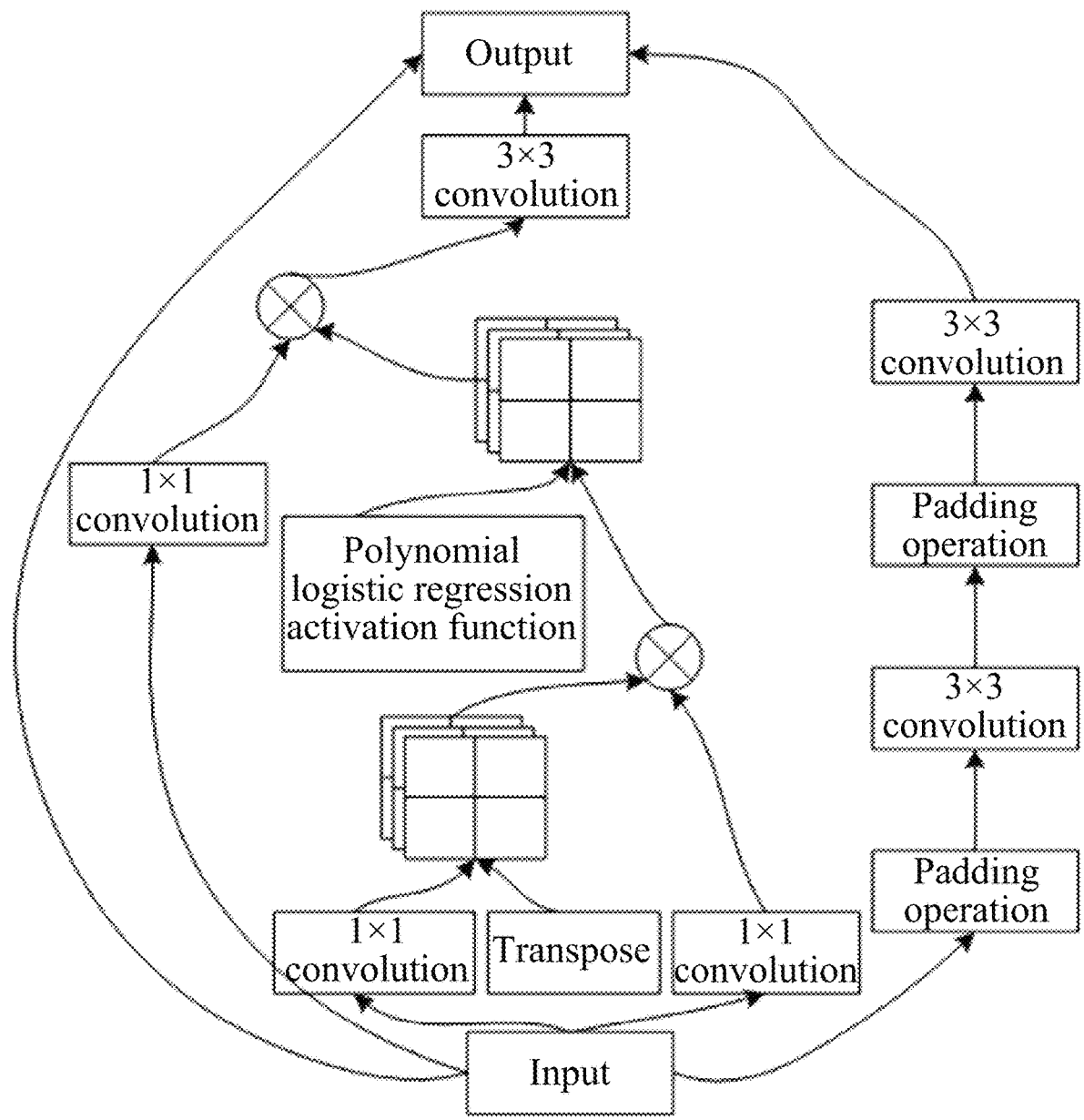
FIG. 4 is a schematic structural diagram of a residual network based on a self-attention mechanism according to an embodiment of the present disclosure.

In this embodiment, as shown in FIG. 4, a self-attention mechanism is combined with a residual network to form a self-attention-based residual network. The self-attention mechanism is widely used in the field of natural language processing, as it can establish semantic connections among multiple features input into a fully connected neural network, constructing a global receptive field between feature vectors. The residual network is widely applied in many computer vision tasks; by introducing residual blocks and shortcut connections, it effectively alleviates the training difficulties of deep neural networks, making it possible to train very deep neural networks and significantly improving model performance. The residual network is composed of multiple stacked residual blocks.

The transformer of the first generator that has been pre-trained uses the following formula to integrate the features in the preliminary feature map:

$$B_j = B_{j-1} + (\text{Conv}(\text{SEAT}(Q_{j-1}, K_{j-1}, V_{j-1}), W_{3\times3}) + b_{j-1}) + (\text{Conv}(\text{ReLU}(\text{Conv}(B_{j-1}, W_{3\times3}) + b_{j-1}), W_{3\times3}) + b_{j-1}).$$

$$\text{SEAT}(Q_{j-1}, K_{j-1}, V_{j-1}) = \text{softmax}((Q_{j-1} K_{j-1}^T / \sqrt{d_k})) V_{j-1}.$$

$$\begin{cases} Q_{j-1} = \text{Conv}(B_{j-1}, W_{1\times1}) + b_{j-1} \\ K_{j-1} = \text{Conv}(B_{j-1}, W_{1\times1}) + b_{j-1} \\ V_{j-1} = \text{Conv}(B_{j-1}, W_{1\times1}) + b_{j-1} \end{cases}$$

where j represents a serial number of a self-attention-based residual block, j=1, 2, . . . , m, and m represents the quantity of self-attention-based residual blocks, with m being set to 6 herein; $B_j$ is an output of a j-th self-attention-based residual block, and $B_{j-1}$ is an output of the (j−1)-th self-attention-based residual block; when j=1, $B_{j-1}=B_0=A_n$ represents the preliminary feature map, that is, an output of the 0th self-attention-based residual block is the same as an output of an n-th convolution layer; $B_m$ is an output of an m-th self-attention-based residual block, that is, the integrated feature map; $W_{3\times3}$ is a 3×3 convolution kernel, and $W_{1\times1}$ is a 1×1 convolution kernel; $b_{j-1}$ is a bias term of the (j−1)-th self-attention-based residual block; SEAT( ) represents a self-attention mechanism; $Q_{j-1}$ is a query matrix of the (j−1)-th self-attention-based residual block; $K_{j-1}$ is a key matrix of the (j−1)-th self-attention-based residual block; $V_{j-1}$ is a value matrix of the (j−1)-th self-attention-based residual block; $d_k$ is the number of columns in the matrices $Q_{j-1}$ and $K_{j-1}$, the superscript T indicates a transpose operation, and softmax( ) represents a polynomial logistic regression activation function. The formula $\text{softmax}((Q_{j-1} K_{j-1}^T / \sqrt{d_k})) V_{j-1}$ establishes semantic associations between features, forming a distance matrix. $\sqrt{d_k}$ is used to prevent inner products of each row in $Q_{j-1}$ and $K_{j-1}$ from becoming excessively large, which would affect semantic relevance; softmax( ) is used to calculate correlation coefficients of each feature with other features. Each row in the distance matrix obtained through softmax( ) represents correlation coefficients of a specific feature with all other features. Finally, the distance matrix is multiplied by $V_{j-1}$ to obtain an output matrix with global associations.

Step 303: Restore the integrated feature map to a target domain through a skip connection mechanism and deconvolution operations by using the decoder of the first generator that has been pre-trained, to obtain the industrial defect image.

In this embodiment, the skip connection mechanism is introduced in the decoder part, and the integrated feature map is restored to the target domain image through a series of deconvolution operations or upsampling operations. The skip connection mechanism connects feature maps from a downsampling path and an upsampling path of the generator, facilitating the transfer and sharing of information by directly connecting low-level and high-level feature maps. This design allows the network to utilize features at different levels to generate images, thereby better preserving and utilizing detailed information of the images, enabling more direct information transfer and reducing information loss in the network, thus improving the performance and accuracy of the model.

The decoder of the first generator that has been pre-trained uses the following formula to restore the integrated feature map to the target domain:

$$C_{c+1} = \text{ReLU}(\text{Deconv}(\text{Skip\_Connection}(C_c, A_{n-c}), W_c) + b_c).$$

$$\hat{Y} = \text{Tan } h(C_o).$$

where c represents a serial number of a deconvolution layer in the decoder, c=0, 1, . . . , o, o represents the quantity of deconvolution layers, and the quantity of deconvolution layers is the same as the quantity of convolution layers, i.e., o=n; $C_c$ is an output of a c-th deconvolution layer, and $C_{c+1}$ is an output of a (c+1)-th deconvolution layer; when c=0, $C_c=C_0=B_m$ represents the integrated feature map, that is, an output of the 0th deconvolution layer is the same as an output of an m-th self-attention-based residual block; $A_{n-c}$ is an output of an (n−c)-th convolution layer; $W_c$ is a convolution kernel of the c-th deconvolution layer; $b_c$ is a bias term of the c-th deconvolution layer; Deconv( ) represents a deconvolution operation; Skip_Connection( ) represents a skip connection operation, which concatenates feature maps along the channel dimension; $\hat{Y}$ represents the industrial defect image, and Tan h( ) represents a hyperbolic tangent activation function.

Figure 5:
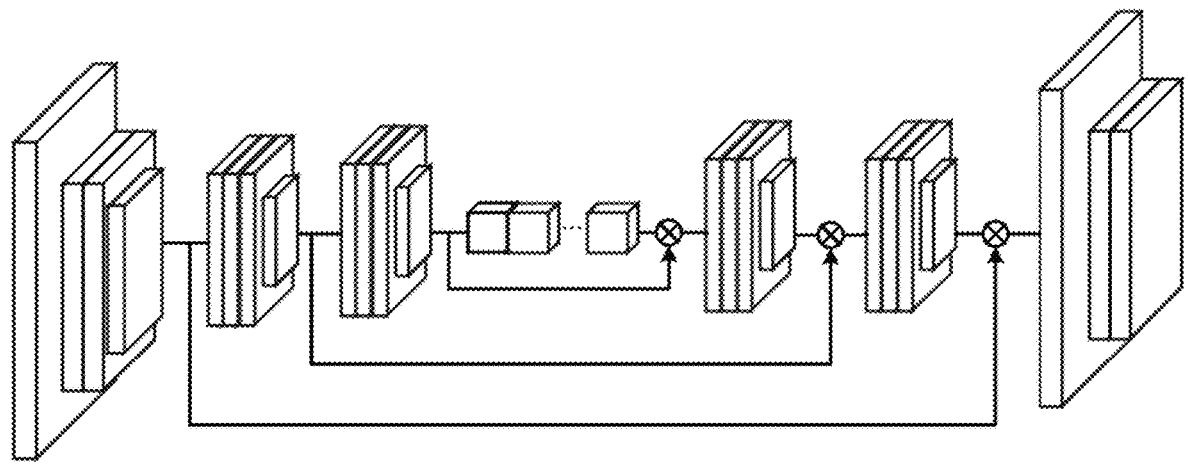
FIG. 5 is a schematic structural diagram of a generator according to an embodiment of the present disclosure.

In an exemplary embodiment, as shown in FIG. 5, the size of the industrial defect-free image input to the first generator is 256×256×3. After padding, the size becomes 256×256×64 (the first rectangular box in FIG. 5). The image then undergoes convolution operations through the first encoder (the second and third rectangular boxes in FIG. 5), normalization, and activation (the fourth rectangular box in FIG. 5), reducing the image size to 128×128×128. Next, the second encoder performs convolution operations (the fifth to seventh rectangular boxes in FIG. 5), normalization, and activation (the eighth rectangular box in FIG. 5), changing the image size to 64×64×256. The third encoder then performs convolution operations (the ninth to eleventh rectangular boxes in FIG. 5), normalization, and activation (the twelfth rectangular box in FIG. 5), keeping the image size at 64×64×256. After that, the transformer integrates the features (the thirteenth to fifteenth rectangular boxes in FIG. 5). Then, the first decoder performs one-dimensional transposed convolution (the sixteenth to eighteenth rectangular boxes in FIG. 5), normalization, and activation (the nineteenth rectangular box in FIG. 5), restoring the image size to 128×128×128. The second decoder then performs one-dimensional transposed convolution (the twentieth to twenty-second rectangular boxes in FIG. 5), normalization, and activation (the twenty-third rectangular box in FIG. 5), restoring the image size to 256×256×64. The image is then padded (the twenty-fourth rectangular box in FIG. 5), restoring the size back to 256×256×3. Finally, another convolution and hyperbolic tangent activation function are applied (the twenty-fifth to twenty-sixth rectangular boxes in FIG. 5) to output the final industrial defect image.

Furthermore, the discriminator of the cyclic GAN maps the input image to a probability feature map D(x) through a series of convolution, activation, and downsampling operations, where the probability feature map represents the probability of each local region of the image being classified as a real image. The calculation formula is as follows:
$D(x)=\sigma(W_s*\text{downsample}(\ldots \text{downsample}(\text{ReLU}(W_1*x+b_1))\ldots)+b_s)$ where x represents an image generated by the generator, i.e., the target domain image generated by the GAN; $W_s$ is a convolution kernel in an s-th layer of the discriminator; $b_s$ is a bias term in the s-th layer of the discriminator; downsample( ) represents a downsampling operation, and $\sigma$ represents a sigmoid function, which maps the output to the range [0, 1]. The ellipsis in the formula indicates the activation and downsampling operations from the second layer to the (s−1)-th layer in the discriminator.

Through continuous dynamic adversarial training between a generator and a discriminator, the GAN optimizes its parameters through adversarial loss to enable the generator to learn the feature distribution of real data. The role of the generator is to learn the distribution of real data so that the distribution of generated data closely approximates the distribution of real data, making it difficult for the discriminator to distinguish between the two data distributions. The role of the discriminator is to determine whether the input data distribution is generated by the generator or is from real data, and to score accordingly. If it is determined that the data distribution is real data distribution, the output of the discriminator is 1; otherwise, the output is 0. Therefore, during training of the GAN, the generator and discriminator are cross-trained, and through continuous adversarial training, the generator and discriminator ultimately reach a Nash equilibrium.

The loss function of the GAN is as follows:

$$\min_G \max_D V(G, D) = E_{x\sim P_{data}(x)}[\log D(x)] + E_{z\sim P_Z(z)}[\log(1 - D(G(z)))].$$

where G represents the first generator, and D represents the discriminator; V(G, D) represents a loss function value of the GAN; z represents a source domain image input to the GAN, and x represents a target domain image generated by the GAN; D(x) represents a score of x in the discriminator; G(z) represents an image generated by the first generator based on z; $P_{data}(x)$ is the distribution of x, and $P_z(z)$ is the distribution of z; $E_{x\sim P_{data}(x)}[\log D(x)]$ represents an expectation of log D(x) when x comes from $P_{data}(x)$, and $E_{z\sim P_z(z)}[\log(1-D(G(z)))]$ represents an expectation of log(1−D(G(z))) when z comes from $P_z(z)$.

The goal of the cyclic GAN is to establish a mapping relationship between the source domain and the target domain, meaning that the generated image has high structural similarity to a content dataset and high structural similarity to a style dataset. A single GAN may encounter uncertainty in mapping combinations, leading to only one image in the target domain being related to the source domain. That is, the generated image is always the same image from the style dataset.

Therefore, the cyclic GAN inherits the adversarial training concept of the GAN and transforms the adversarial training of the GAN into a cyclic adversarial mode through a dual training and learning approach. The network changes from one generator and one discriminator to two generators, defined as G and F, and two discriminator networks, defined as $D_X$ and $D_Y$, and added with a cyclic consistency loss function to constrain the structural similarity between generated images and real images.

Specifically, the input industrial defect-free image is defined as a real_X domain image, the generated industrial defect image is defined as a fake_Y domain image, the input industrial defect image is defined as a real_Y domain image, and the generated industrial defect-free image is defined as a fake_X domain image.

Figure 6:
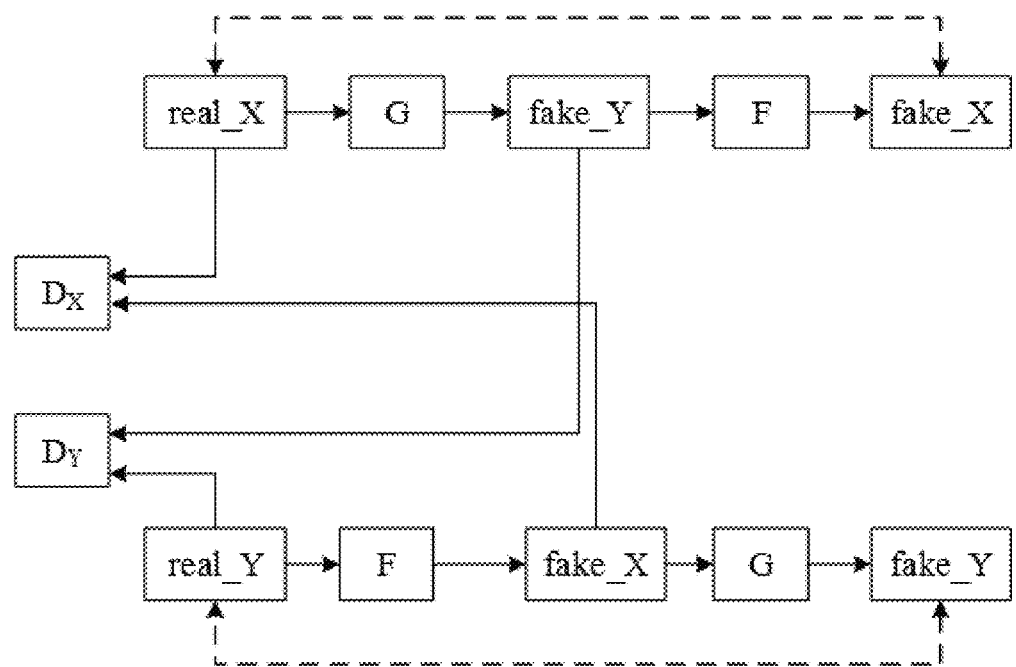
FIG. 6 is a schematic structural diagram of a cyclic generative adversarial network according to an embodiment of the present disclosure.

As shown in FIG. 6, in the upper part of the cyclic GAN, an image from the real_X domain is mapped to generate an image $\bar{y}=G(x)$ in the fake_Y domain through the first generator G, and the first discriminator DY determines whether G(x) represents a real data distribution or a generated data distribution. Then, based on the concept of cyclic consistency, the generated image $\bar{y}=G(x)$ is remapped to generate an image $F(\bar{y})$ in the fake_X domain through the second generator F. To prevent the generated image $\bar{y}$ from losing the content of the real_X domain image, calculation is performed on the generated image $F(\bar{y})$ and the real_X domain image based on the L2 norm loss function, making these two images as similar as possible, i.e., $F(G(x))\approx x$.

In the lower part of the cyclic GAN structure, a real_Y domain image is first mapped to generate a fake_X domain image $\bar{x}=F(y)$ through the second generator F, and then the first generator G generates a fake_Y domain image $G(\bar{x})$ through mapping, ultimately achieving $G(F(y))\approx y$. At this point, the two generators can achieve style transfer, meaning that stable industrial defect images can be generated from industrial defect-free images, or stable industrial defect-free images can be generated from industrial defect images.

The adversarial generation loss function of the first generator is:

$L_{GAN}(G,D_Y,X,Y)=E_{y\sim P_{data}(y)}[\log D_Y(y)]+E_{x\sim P_{data}(x)}[\log(1-D_Y(G(x)))]$.

The adversarial generation loss function of the second generator is:

$L_{GAN}(F,D_X,X,Y)=E_{x\sim P_{data}(x)}[\log D_X(x)]+E_{y\sim P_{data}(y)}[\log(1-D_X(G(y)))]$.

The cyclic consistency loss function is the L2 norm loss function, also known as the mean squared error, with the formula as follows:

$L_{cyc}(G,F)=E_{x\sim P_{data}(x)}[[F(G(x))-x]_1]+E_{y\sim P_{data}(y)}[[G(F(y))-y]_1]$.

The loss function of the defect image generation model during cyclic adversarial training is:

$L_{GAN}(G,F,D_X,D_Y)=L_{GAN}(G,D_Y,X,Y)+L_{GAN}(F,D_X,X,Y)+L_{cyc}(G,F)$.

where $L_{GAN}(G, F, D_X, D_Y)$ is a total loss function value, $L_{GAN}(G, D_Y, X, Y)$ is an adversarial generation loss function value of the first generator, $L_{GAN}(F, D_X, X, Y)$ is an adversarial generation loss function value of the second generator, and $L_{cyc}(G, F)$ is a cyclic consistency loss function value; G represents the first generator, F represents the second generator, $D_Y$ represents the first discriminator, and $D_X$ represents the second discriminator; X is source domain image, representing a defect-free image, and Y is a target domain image, representing a defect image.

The collected positive and negative sample pairs of industrial products are fed into the cyclic GAN based on self-attention and skip connections for cyclic adversarial training. Specifically, parameters of the two generators and two discriminators are adjusted through backpropagation based on the adversarial loss and cyclic consistency loss, constraining the structural similarity between the generated images and the real images, thereby ultimately obtaining the defect image generation model. Afterward, an industrial defect-free image is input into the corresponding generator of the defect image generation model, namely, the first generator where the source domain image is the industrial defect-free image and the target domain image is the industrial defect image. Running the defect image generation model once allows the first generator to output an industrial defect image. Furthermore, a parameter for the quantity of output images can be set in the defect image generation model, enabling the trained first generator to generate multiple stable and high-quality industrial defect images.

The present disclosure addresses issues such as uncontrollable and poor-quality industrial defect image generation caused by complex backgrounds, significant defect variations, and noise interference in complex scenarios. By introducing a self-attention mechanism and a skip connection mechanism in the generator, the model performs long-distance and multi-scale feature extraction on the input source domain image, enhancing the global perspective of feature extraction and the ability to extract multi-scale features. As a result, the generated image is similar to the target domain image. Additionally, the cyclic GAN with dual generators and dual discriminators is used to optimize the original GAN, reducing the loss of important detail information during industrial defect image generation, improving the stability and quality of industrial defect image generation, maintaining the consistency of the generated image content, and enhancing the robustness of the defect image generation model.

The present disclosure also provides an application scenario where the above method for generating an industrial defect image is applied. Specifically, the method for generating an industrial defect image provided in this embodiment can be applied in the scenario of surface defect detection of industrial products. The scenario of surface defect detection of industrial products includes sample acquisition, defect detection model training, and defect detection stages. First, multiple industrial defect images are generated using the method for generating an industrial defect image provided in the present disclosure, to form a sample set. Then, the defect detection model training is performed, where the defect detection model is trained using the sample set. Finally, the trained defect detection model is used to detect defects in actual industrial products.

Figure 7:
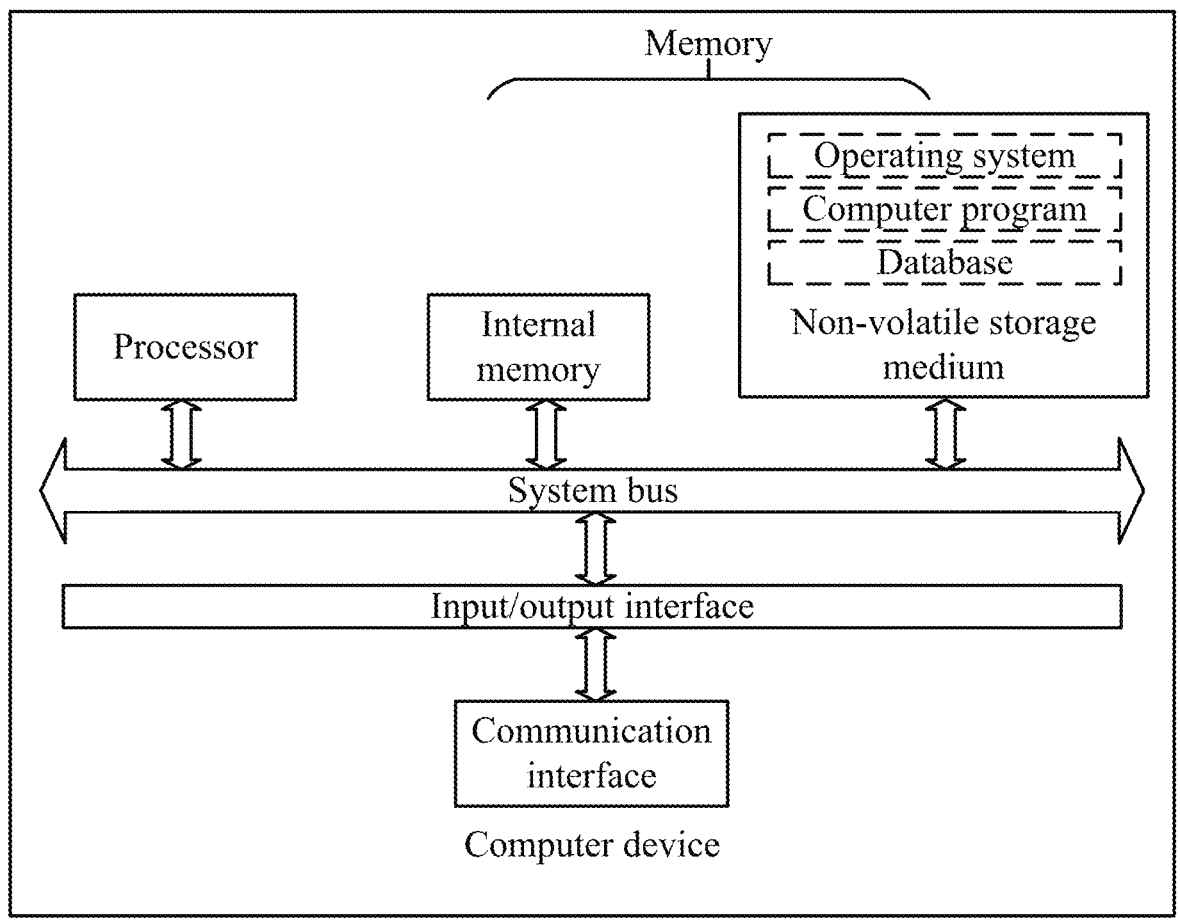
FIG. 7 is a schematic structural diagram of a computer device according to an embodiment of the present disclosure.

In an embodiment, a computer device is provided. The computer device may be a server or a terminal, and an internal structure thereof may be as shown in FIG. 7. The computer device includes a processor, a memory, an input/output (I/O) interface and a communication interface. The processor, the memory and the I/O interface are connected through a system bus. The communication interface is connected to the system bus through the I/O interface. The processor of the computer device is configured to provide computing and control capabilities. The memory of the computer device includes a nonvolatile storage medium and an internal memory. The non-volatile storage medium stores an operating system, a computer program, and a database. The internal memory provides an environment for operation of the operating system and the computer program in the nonvolatile storage medium. The database of the computer device is configured to store industrial defect-free images and the defect image generation model. The input/output interface of the computer device is configured to exchange information between the processor and an external device. The communication interface of the computer device is configured to communicate with an external terminal through a network. When the computer program is executed by the processor, a method for generating an industrial defect image is implemented.

Those skilled in the art may understand that the structure shown in FIG. 7 is only a block diagram of a partial structure related to the solution of the present disclosure and does not constitute a limitation on the computer device to which the solution of the present disclosure is applied. Specifically, the computer device may include more or fewer components than those shown in the figure, or some components may be combined, or a different component arrangement may be used. In an exemplary embodiment, a computer device is provided, including a memory and a processor, where the memory stores a computer program, and the computer program is executed by the processor to implement the steps of the above method embodiment.

In an exemplary embodiment, a computer-readable storage medium is provided. The computer-readable storage medium stores a computer program, and the computer program is executed by a processor to implement the steps of the above method embodiment.

In an exemplary embodiment, a computer program product is provided. The computer program product includes a computer program, and the computer program is executed by a processor to implement the steps of the above method embodiment.

It is to be noted that information of a user (including but not limited to device information of the user, personal information of the user and the like) and data (including but not limited to data for analysis, data for storage, data for exhibition and the like) in the present disclosure are information and data authorized by the user or fully authorized by each party, and relevant data shall be acquired, used and processed according to related regulations.

Those of ordinary skill in the art may understand that all or some of the procedures in the method of the foregoing embodiments may be implemented by a computer program instructing related hardware. The computer program may be stored in a nonvolatile computer-readable storage medium. When the computer program is executed, the procedures in the embodiments of the foregoing method may be performed. Any reference to a memory, a storage, a database, or other media used in the embodiments of the present disclosure may include a non-volatile and/or volatile memory. The non-volatile memory may include a read-only memory (ROM), a magnetic tape, a floppy disk, a flash memory, an optical memory, a high-density embedded non-volatile memory, a Resistive Random Access Memory (ReRAM), a Magnetoresistive Random Access Memory (MRAM), a Ferroelectric Random Access Memory (FRAM), a Phase Change Memory (PCM), a graphene memory, and the like. The volatile memory may include a random access memory (RAM) or an external cache memory. As an illustration rather than a limitation, the RAM may be in various forms, such as a static random access memory (SRAM) or a dynamic random access memory (DRAM).

The database in the embodiments of the present disclosure may include at least one of a relational database and a non-relational database. The non-relational database may include a distributed database based on a blockchain, but is not limited thereto. The processor in the embodiments of the present disclosure may be a general-purpose processor, a central processor, a graphics processor, a digital signal processor (DSP), a programmable logic device, and a data processing logic device based on quantum computing, but is not limited thereto.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Several examples are used herein for illustration of the principles and implementations of this application. The description of the foregoing examples is used to help illustrate the method of this application and the core principles thereof. In addition, those of ordinary skill in the art can make various modifications in terms of specific implementations and scope of application in accordance with the teachings of this application. In conclusion, the content of the present specification shall not be construed as a limitation to this application.

What is claimed is:

1. A method for generating an industrial defect image, comprising:

acquiring an industrial defect-free image; and generating an industrial defect image based on the industrial defect-free image by using a defect image generation model, wherein the defect image generation model is constructed based on a cyclic Generative Adversarial Network (GAN); the defect image generation model comprises two generators and two discriminators, with each generator comprising an encoder, a transformer, and a decoder connected in sequence; the encoder uses convolution operations to extract features from an input image, the transformer uses a self-attention-based residual network to transform an image output by the encoder, and the decoder uses a skip connection mechanism and deconvolution operations to decode an image output by the transformer to obtain a generated image; the two generators of the defect image generation model comprise a first generator and a second generator;

wherein said generating the industrial defect image based on the industrial defect-free image by using the defect image generation model specifically comprises:

performing feature extraction on the industrial defect-free image through convolution operations by using the encoder of the first generator that has been pre-trained, to obtain a preliminary feature map, wherein the encoder of the first generator that has been pre-trained uses the following formula to extract features from the industrial defect-free image:

$A_i = ReLU(Conv(A_{i-1}, W_i) + b_i)$;

wherein i represents a serial number of a convolution layer in the encoder, i=1, 2, . . . , n, and n represents a quantity of convolution layers; $A_{i-1}$ is an output of an (i−1)-th convolution layer; $A_i$ is an output of an i-th convolution layer; $A_0$ is an industrial defect-free image, $W_i$ is a convolution kernel of the i-th convolution layer; $b_i$ is a bias term of the i-th convolution layer; Conv( ) represents a convolution operation, and ReLU( ) represents a rectified linear activation function;

integrating features in the preliminary feature map through the self-attention-based residual network by using the transformer of the first generator that has been pre-trained, to obtain an integrated feature map, wherein the transformer of the first generator that has been pre-trained uses the following formula to integrate the features in the preliminary feature map:

$$B_j = B_{j-1} + (Conv(SEAT(Q_{j-1}, K_{j-1}, V_{j-1},), W_{3\times3}) + b_{j-1}) +$$
$$(Conv(ReLU(Conv(B_{j-1}, W_{3\times3}) + b_{j-1}), W_{3\times3}) + b_{j-1});$$
$$SEAT(Q_{j-1}, K_{j-1}, V_{j-1}) = softmax((Q_{j-1}K_{j-1}^T)/\sqrt{d_k})V_{j-1};$$
$$\begin{cases} Q_{j-1} = Conv(B_{j-1}, W_{1\times1}) + b_{j-1} \\ K_{j-1} = Conv(B_{j-1}, W_{1\times1}) + b_{j-1} \\ V_{j-1} = Conv(B_{j-1}, W_{1\times1}) + b_{j-1} \end{cases}$$

wherein j represents a serial number of a self-attention-based residual block, j=1, 2, . . . , m, and m represents a quantity of self-attention-based residual blocks; $B_j$ is an output of a j-th self-attention-based residual block, and $B_{j-1}$ is an output of a (j−1)-th self-attention-based residual block; $B_0 = A_n$ represents the preliminary feature map; $W_{3\times3}$ is a 3×3 convolution kernel, and $W_{1\times1}$ is a 1×1 convolution kernel; $b_{j-1}$ is a bias term of the (j)-th self-attention-based residual block; SEAT( ) represents a self-attention mechanism; $Q_{j-1}$ is a query matrix of the (j−1)-th self-attention-based residual block; $K_{j-1}$ is a key matrix of the (j−1)-th self-attention-based residual block; $V_{j-1}$ is a value matrix of the (j−1)-th self-attention-based residual block; $d_k$ is the number of columns in the matrices $Q_{j-1}$ and $K_{j-1}$, the superscript T indicates a transpose operation, and softmax( ) represents a polynomial logistic regression activation function; and restoring the integrated feature map to a target domain through a skip connection mechanism and deconvolution operations by using the decoder of the first generator that has been pre-trained, to obtain the industrial defect image.

2. The method for generating an industrial defect image according to claim 1, wherein the defect image generation model is obtained by performing cyclic adversarial training on the two generators and the two discriminators using a sample set in advance; the training sample set comprises a plurality of pairs of positive and negative samples, wherein the positive samples are defect-free sample images, and the negative samples are defect sample images; and the two discriminators of the defect image generation model are referred to as a first discriminator and a second discriminator; during a cyclic adversarial training process, the first generator is used to generate defect images based on the defect-free sample images or defect-free images generated by the second generator, while the second generator is used to generate defect-free images based on the defect sample images or the defect images generated by the first generator; the first discriminator is used to determine data distribution of the defect images generated by the first generator, while the second discriminator is used to determine data distribution of the defect-free images generated by the second generator.

3. The method for generating an industrial defect image according to claim 1, wherein the decoder of the first generator that has been pre-trained uses the following formula to restore the integrated feature map to the target domain:

$$C_{c+1}=\text{ReLU}(\text{Deconv}(\text{Skip\_Connection}(C_c, A_{n-c}), W_c)+b_c);$$

$$\hat{Y}=\text{Tan } h(C_o);$$

wherein c represents a serial number of a deconvolution layer in the decoder, c=0, 1, . . . , o, and o represents a quantity of deconvolution layers; $C_c$ is an output of a c-th deconvolution layer, $C_{c+1}$ is an output of a (c+1)-th deconvolution layer, $C_0=B_m$ represents the integrated feature map, and $A_{n-c}$ is an output of an (n–c)-th convolution layer; $W_c$ is a convolution kernel of the c-th deconvolution layer; $b_c$ is a bias term of the c-th deconvolution layer; Deconv( ) represents a deconvolution operation; Skip_Connection( ) represents a skip connection operation; $\hat{Y}$ represents the industrial defect image, and Tan h( ) represents a hyperbolic tangent activation function.

4. The method for generating an industrial defect image according to claim 2, wherein a loss function of the defect image generation model during cyclic adversarial training is:

$$L_{GAN}(G,F,D_X,D_Y)=L_{GAN}(G,D_Y,X,Y)+L_{GAN}(F,D_X,X,Y)+L_{cyc}(G,F);$$

wherein $L_{GAN}(G, F, D_X, D_Y)$ is a total loss function value, $L_{GAN}(G, D_Y, X, Y)$ is an adversarial generation loss function value of the first generator, $L_{GAN}(F, D_X, X, Y)$ is an adversarial generation loss function value of the second generator, and $L_{cyc}(G, F)$ is a cyclic consistency loss function value; G represents the first generator, F represents the second generator, $D_Y$ represents the first discriminator, and $D_X$ represents the second discriminator; X is source domain image, representing a defect-free image, and Y is a target domain image, representing a defect image.

5. A computer device, comprising a memory, a processor, and a computer program stored in the memory and executable on the processor, wherein the computer program is executed by the processor to implement the method for generating an industrial defect image according to claim 1.

6. The computer device according to claim 5, wherein the defect image generation model is obtained by performing cyclic adversarial training on the two generators and the two discriminators using a sample set in advance; the training sample set comprises a plurality of pairs of positive and negative samples, wherein the positive samples are defect-free sample images, and the negative samples are defect sample images; and the two discriminators of the defect image generation model are referred to as a first discriminator and a second discriminator; during a cyclic adversarial training process, the first generator is used to generate defect images based on the defect-free sample images or defect-free images generated by the second generator, while the second generator is used to generate defect-free images based on the defect sample images or the defect images generated by the first generator; the first discriminator is used to determine data distribution of the defect images generated by the first generator, while the second discriminator is used to determine data distribution of the defect-free images generated by the second generator.

7. The computer device according to claim 5, wherein the decoder of the first generator that has been pre-trained uses the following formula to restore the integrated feature map to the target domain:

$$C_{c+1}=\text{ReLU}(\text{Deconv}(\text{Skip\_Connection}(C_c, A_{n-c}), W_c)+b_c);$$

$$\hat{Y}=\text{Tan } h(C_o);$$

wherein c represents a serial number of a deconvolution layer in the decoder, c=0, 1, . . . , o, and o represents a quantity of deconvolution layers; $C_c$ is an output of a c-th deconvolution layer, $C_{c+1}$ is an output of a (c+1)-th deconvolution layer, $C_0=B_m$ represents the integrated feature map, and $A_{n-c}$ is an output of an (n–c)-th convolution layer; $W_c$ is a convolution kernel of the c-th deconvolution layer; $b_c$ is a bias term of the c-th deconvolution layer; Deconv( ) represents a deconvolution operation; Skip_Connection( ) represents a skip connection operation; $\hat{Y}$ represents the industrial defect image, and Tan h( ) represents a hyperbolic tangent activation function.

8. The computer device according to claim 6, wherein a loss function of the defect image generation model during cyclic adversarial training is:

$$L_{GAN}(G,F,D_X,D_Y)=L_{GAN}(G,D_Y,X,Y)+L_{GAN}(F,D_X,X,Y)+L_{cyc}(G,F);$$

wherein $L_{GAN}(G, F, D_X, D_Y)$ is a total loss function value, $L_{GAN}(G, D_Y, X, Y)$ is an adversarial generation loss function value of the first generator, $L_{GAN}(F, D_X, X, Y)$ is an adversarial generation loss function value of the second generator, and $L_{cyc}(G, F)$ is a cyclic consistency loss function value; G represents the first generator, F represents the second generator, $D_Y$ represents the first discriminator, and $D_X$ represents the second discriminator; X is source domain image, representing a defect-free image, and Y is a target domain image, representing a defect image.

* * * * *